US012572233B2

(12) United States Patent
Weng et al.

(10) Patent No.: US 12,572,233 B2
(45) Date of Patent: Mar. 10, 2026

(54) ELECTRONIC DEVICE

(71) Applicant: CARUX TECHNOLOGY PTE. LTD.,
Singapore (SG)

(72) Inventors: Tsan-Po Weng, Tainan (TW);
Chia-Ling Wu, Tainan (TW)

(73) Assignee: CARUX TECHNOLOGY PTE. LTD.,
Singapore (SG)

( * ) Notice: Subject to any disclaimer, the term of this
patent is extended or adjusted under 35
U.S.C. 154(b) by 0 days.

(21) Appl. No.: 18/895,317

(22) Filed: Sep. 24, 2024

(65) Prior Publication Data

US 2025/0138668 A1      May 1, 2025

(30) Foreign Application Priority Data

Oct. 25, 2023    (CN) .......................... 202311393111.9

(51) Int. Cl.
*G06F 3/041*            (2006.01)
(52) U.S. Cl.
CPC ........ *G06F 3/04164* (2019.05); *G06F 3/0412*
(2013.01)
(58) Field of Classification Search
None
See application file for complete search history.

(56) References Cited

U.S. PATENT DOCUMENTS

2013/0222276 A1*   8/2013  Kim .................... G06F 3/04883
                                                      345/173
2019/0339818 A1*  11/2019  Rhe ........................ G06F 3/0443
2022/0147214 A1*   5/2022  Kim ...................... G06F 3/0446

FOREIGN PATENT DOCUMENTS

CN          105301820        2/2016
TW          201804303        2/2018

* cited by examiner

*Primary Examiner* — Aneeta Yodichkas
(74) *Attorney, Agent, or Firm* — JCIPRNET

(57)            ABSTRACT

The disclosure provides an electronic device. The electronic
device has a first touch area and a second touch area. The
first touch module is disposed in the first touch area and
includes multiple first touch electrodes. The second touch
module is disposed in the second touch area and includes
multiple second touch electrodes. Multiple display elec-
trodes are disposed in the first touch area, but not disposed
in the second touch area. The integrated chip is electrically
connected to the first touch module and the second touch
module, and is configured to process a first touch signal
transmitted by at least one of the first touch electrodes and
process a second touch signal transmitted by at least one of
the second touch electrodes. The electronic device of the
disclosure can effectively save the number of pads of chips
and reduce the chip space.

19 Claims, 13 Drawing Sheets

ELECTRONIC DEVICE

CROSS-REFERENCE TO RELATED APPLICATION

This application claims the priority benefit of China application serial no. 202311393111.9, filed on Oct. 25, 2023. The entirety of the above-mentioned patent application is hereby incorporated by reference herein and made a part of this specification.

BACKGROUND

Technical Field

The disclosure relates to an electronic device, and in particular to an electronic device including a touch module.

Description of Related Art

As the size of the touch panel increases, since the number of touch electrodes increases, the number of pads of chips for drive and touch electrodes also increases. Moreover, since the number of chips may also increase, the chip space occupied in the electronic device also increases.

SUMMARY

The disclosure provides an electronic device that can effectively save the number of pads of chips and reduce the chip space.

According to an embodiment of the disclosure, the electronic device has a first touch area and a second touch area. The electronic device includes a first touch module, a second touch module, multiple display electrodes, and an integrated chip. The first touch module is disposed in the first touch area and includes multiple first touch electrodes. The second touch module is disposed in the second touch area and includes multiple second touch electrodes. The display electrodes are disposed in the first touch area, but not disposed in the second touch area. The integrated chip is electrically connected to the first touch module and the second touch module, and is configured to process a first touch signal transmitted by at least one of the first touch electrodes and process a second touch signal transmitted by at least one of the second touch electrodes.

According to an embodiment of the disclosure, the electronic device has a first touch area and a second touch area. The electronic device includes multiple first touch electrodes, multiple second touch electrodes, multiple display electrodes, a first processing unit, a first touch signal line, a first display signal line, a second processing unit, and a second touch signal line. The first touch electrodes are disposed in the first touch area. The second touch electrodes are disposed in the second touch area. The display electrodes are disposed in the first touch area, but not disposed in the second touch area. The first touch signal line is electrically connected between the first processing unit and at least one of the first touch electrodes. The first display signal line is electrically connected between the first processing unit and at least one of the display electrodes. The second touch signal line is electrically connected between the second processing unit and at least one of the second touch electrodes.

Based on the above, the electronic device of the disclosure can effectively save the chip space by driving the touch modules through the integrated chip or respectively driving different touch modules through the first processing unit and the second processing unit, so as to effectively save the number of pads of chips.

In order for the features and advantages of the disclosure to be more comprehensible, the following specific embodiments are described in detail in conjunction with the drawings.

DESCRIPTION OF THE EMBODIMENTS

Figure 1:
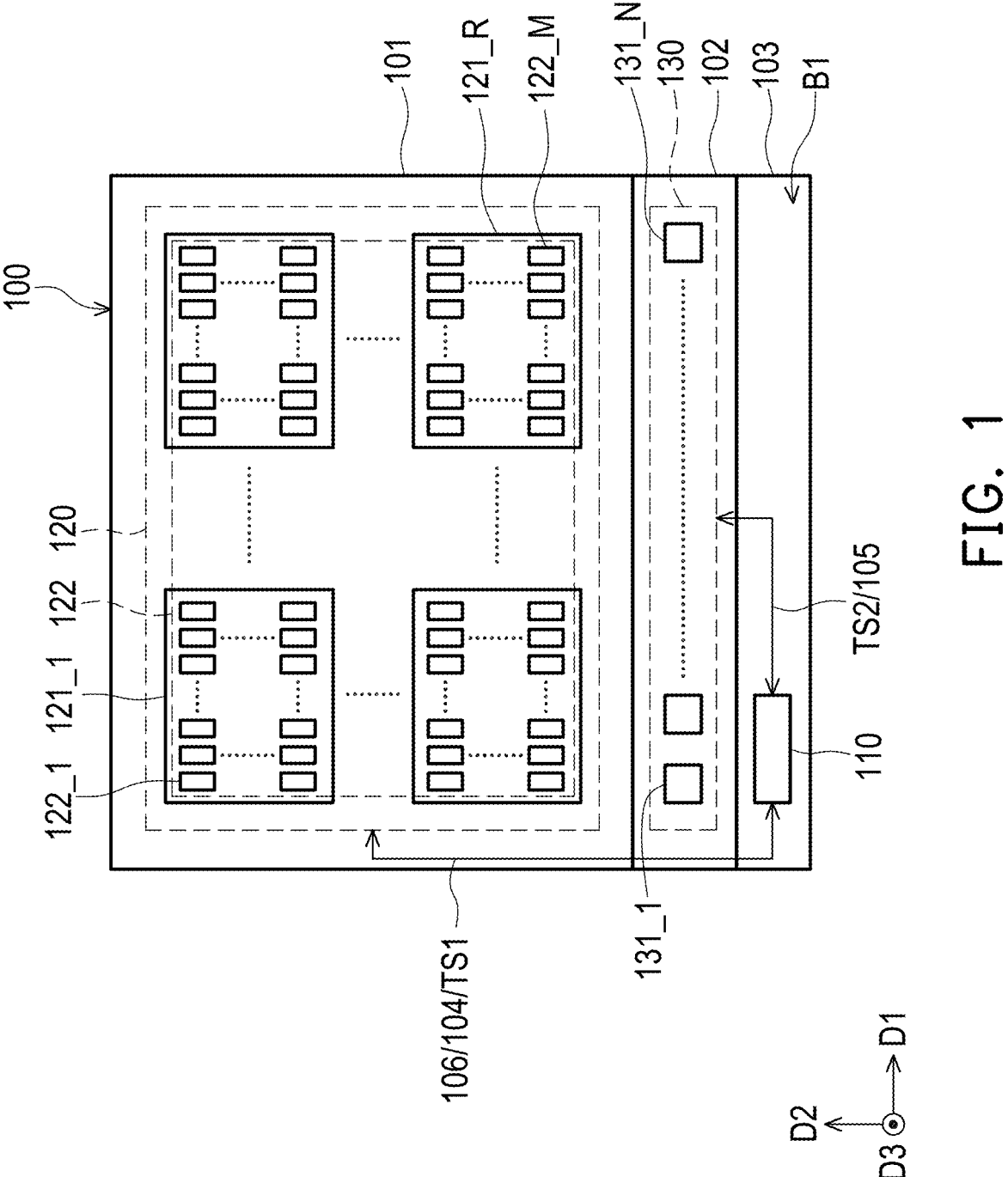
FIG. 1 is a schematic top view of an electronic device according to an embodiment of the disclosure.

Reference will now be made in detail to the exemplary embodiments of the disclosure, examples of which are illustrated in the drawings. Wherever possible, the same reference numerals are used in the drawings and description to refer to the same or similar parts.

Throughout the specification and the appended claims of the disclosure, certain terms are used to refer to specific elements. It should be understood by persons skilled in the art that electronic device manufacturers may refer to the same component by different names. The disclosure does not intend to distinguish between components with the same function but different names. In the following specification and claims, words such as "containing" and "comprising" are open-ended words, so the words should be interpreted as "including but not limited to . . . ".

Directional terms, such as "upper", "lower", "front", "rear", "left", and "right", mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, areas, and/or structures may be reduced or enlarged for clarity.

In some embodiments of the disclosure, terms related to bonding and connection, such as "connection" and "interconnection", unless otherwise defined, may mean that two structures are in direct contact, or may also mean that two structures are not in direct contact, wherein there is another structure disposed between the two structures. Also, the terms related to bonding and connection may also include the case where the two structures are both movable or the two structures are both fixed. Furthermore, the term "coupling" includes any direct or indirect means of electrical connection. In the case of direct electrical connection, endpoints of elements on two circuits are directly connected or connected to each other by a conductor segment, while in the case of indirect electrical connection, there is a switch, a diode, a capacitor, an inductor, a resistor, other suitable elements, or a combination of the above elements between the endpoints of the elements on the two circuits, but not limited thereto.

The terms "about", "equal to", "equivalent" or "same", "substantially", or "roughly" are generally interpreted as within 20% of a given value or range, or interpreted as within 10%, 5%, 3%, 2%, 1%, or 0.5% of the given value or range.

Ordinal numbers such as "first" and "second" used in the specification and the claims are used to modify elements, and the ordinal numbers do not imply and represent that the component(s) have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terms, whereby a first member in the specification may be a second member in the claims. It should be noted that in the following embodiments, the technical features of several different embodiments may be replaced, reorganized, and mixed to complete other embodiments without departing from the spirit of the disclosure.

It should be noted that in the following embodiments, features of several different embodiments may be replaced, recombined, and mixed to complete other embodiments without departing from the spirit of the disclosure. As long as the features of the embodiments do not violate the spirit of the disclosure or conflict with each other, the features may be arbitrarily mixed and matched for use.

Unless otherwise defined, all terms (including technical and scientific terms) used herein have the same meaning as commonly understood by persons skilled in the art to which the disclosure belongs. It can be understood that the terms, such as the terms defined in commonly used dictionaries, should be interpreted as having meanings consistent with the relevant art and the background or the context of the disclosure, and should not be interpreted in an idealized or overly formal manner, unless otherwise defined in the embodiments of the disclosure.

In the disclosure, the electronic device may include a display device, a backlight device, an antenna device, a touch device, a sensing device, or a splicing device, but not limited thereto. The electronic device may be a bendable or flexible electronic device. The display device may be a non-self-luminous display device or a self-luminous display device. The antenna device may be a liquid crystal type antenna device or a non-liquid crystal type antenna device. The sensing device may be a sensing device that senses capacitance, light, heat energy, or ultrasonic waves, but not limited thereto. The electronic device may include an electronic element. The electronic element may include a passive element and an active element, such as a capacitor, a resistor, an inductor, a diode, and a transistor. The diode may include a light emitting diode or a photodiode. The light emitting diode may, for example, include an organic light emitting diode (OLED), a mini LED, a micro LED, or a quantum dot LED, but not limited thereto. The splicing device may be, for example, a display splicing device or an antenna splicing device, but not limited thereto. It should be noted that the electronic device may be any permutation and combination of the above, but not limited thereto.

In the disclosure, the electrical connection may be a direct electrical connection or an indirect electrical connection.

FIG. 1 is a schematic top view of an electronic device according to an embodiment of the disclosure. Referring to FIG. 1, an electronic device 100 includes an integrated chip (IC) 110, a first touch module 120, and a second touch module 130. The integrated chip 110 is electrically connected to the first touch module 120 and the second touch module 130. In the embodiment, the integrated chip 110 is configured to drive the first touch module 120 and the second touch module 130. In the embodiment, the electronic device 100 may be, for example, a vehicle display device and is configured to connect to other electronic equipment on the vehicle, so as to provide, for example, functions such as audio and video, driving assistance, and/or peripheral equipment control in the vehicle.

In the embodiment, the electronic device 100 may include a first touch area 101, a second touch area 102, and a circuit configuration area 103. It is worth noting that the circuit configuration area described in the embodiment refers to a non-touch area adjacent to a touch area and is configured to provide relevant driving circuits and/or chips. According to some embodiments, the circuit configuration area may be a non-display area adjacent to a display area. The circuit configuration area described in the disclosure may be different areas on the same substrate from the touch area and/or the display area or different areas on different substrates, but the disclosure is not limited thereto. For example, in FIG. 1, the circuit configuration area 103 is adjacent to the second touch area 102, and the integrated chip 110 is disposed in the circuit configuration area 103.

In the disclosure, the substrate may be a rigid substrate, a flexible substrate, or a soft-rigid composite material. The material of the substrate may be glass, quartz, an organic material, an inorganic material, a polymer, a wafer, ceramics, other applicable materials, or a combination thereof.

In the embodiment, touch surfaces (and display surfaces) of the first touch area 101 and the second touch area 102 may be parallel to a plane formed by a direction D1 and a direction D2. The direction D1, the direction D2, and a direction D3 are perpendicular to each other. Alternatively, in an embodiment, the touch surfaces (and the display surfaces) of the first touch area 101 and/or the second touch area 102 may be curved surfaces. In the embodiment, the electronic device 100 may provide touch and display functions through the first touch area 101, and the electronic device 100 may provide a touch function through the second touch area 102.

As shown in FIG. 1, in the embodiment, the first touch module 120 may be disposed in the first touch area 101 and includes multiple first touch electrodes 121_1 to 121_R, where R is a positive integer. The second touch module 130 may be disposed in the second touch area 102 and includes multiple second touch electrodes 131_1 to 131_N, where N is a positive integer. R and N may be equal or unequal, which is not limited. R may be greater than or less than N.

A display layer 122 includes multiple display electrodes 122_1 to 122_M, which may be disposed in the first touch area 101, but not disposed in the second touch area 102, where Mis a positive integer. In the disclosure, the display electrode may be a pixel electrode, a common electrode, an anode, a cathode, or a combination of the above. The display electrodes 122_1 to 122_M are separated from the second touch area 102.

The relative structural relationship between the first touch module 120 and the display electrodes may be in-cell touch, on-cell touch, or out-cell touch.

As shown in FIG. 1, in some embodiments, the first touch module 120 may be an in-cell touch and on-cell touch module, which means that the touch electrodes and the display electrodes are disposed on the same panel (that is, a touch display panel) or in the same touch module. In other words, the first touch module 120 may include the display layer 122, the display layer 122 may include multiple display modules 122, and the display modules 122 may include the display electrodes 122_1 to 122_M. For example, in an in-cell touch display panel, the first touch module 120 may include a substrate, the first touch electrodes 121_1 to 121_R, and the display electrodes 122_1 to 122_M. The first touch electrodes 121_1 to 121_R and the display electrodes 122_1 to 122_M are disposed on the same substrate. Taking the display panel as a liquid crystal display panel as an example, the display electrodes 122_1 to 122_M may be pixel electrodes. The first touch electrodes and the display electrodes may overlap. For example, in FIG. 1, the first touch electrodes 121_1 and the display electrodes 122_1 may overlap, and one first touch electrode 121_1 may overlap with multiple display electrodes 122_1 to 122_M. When the electronic device 100 is operated in a display mode, the first touch electrodes 121_1 to 121_R may serve as common electrodes. Moreover, when the electronic device 100 is operated in a touch mode, the first touch electrodes 121_1 to 121_R may serve as sensing electrodes for touch. That is, the first touch electrodes may be commonly used as the common electrodes.

Alternatively, in an embodiment, the first touch module 120 may be a plug-in type, which means that the touch module is plugged into the display module. That is, the touch electrodes and the display electrodes are disposed in different panels (or modules). The first touch module 120 includes the first touch electrodes 121_1 to 121_R, but does not include the display electrodes, that is, does not include the display layer 122. The display module is disposed in the first touch area 101, and the display layer 122 may be included in the display module. In detail, the display module includes the display layer 122, the display layer 122 includes the display electrodes 122_1 to 122_M, and the display module and the first touch module 120 are different separated modules (or panels). For example, the first touch module 120 is a touch panel, the display module is a display panel, and the display panel includes the display layer 122. Moreover, the shape and the arrangement position of the first touch electrodes 121_1 to 121_R are not limited to as shown in the drawing, and the shape may be, for example, rhombus, square, rectangular, etc. Similarly, the relative structural relationship between the second touch module 130 and the display electrodes may be in-cell touch, on-cell touch, or out-cell touch. Reference may be made to the relevant content of the first touch module 120, which will not be described again here.

Figure 12:
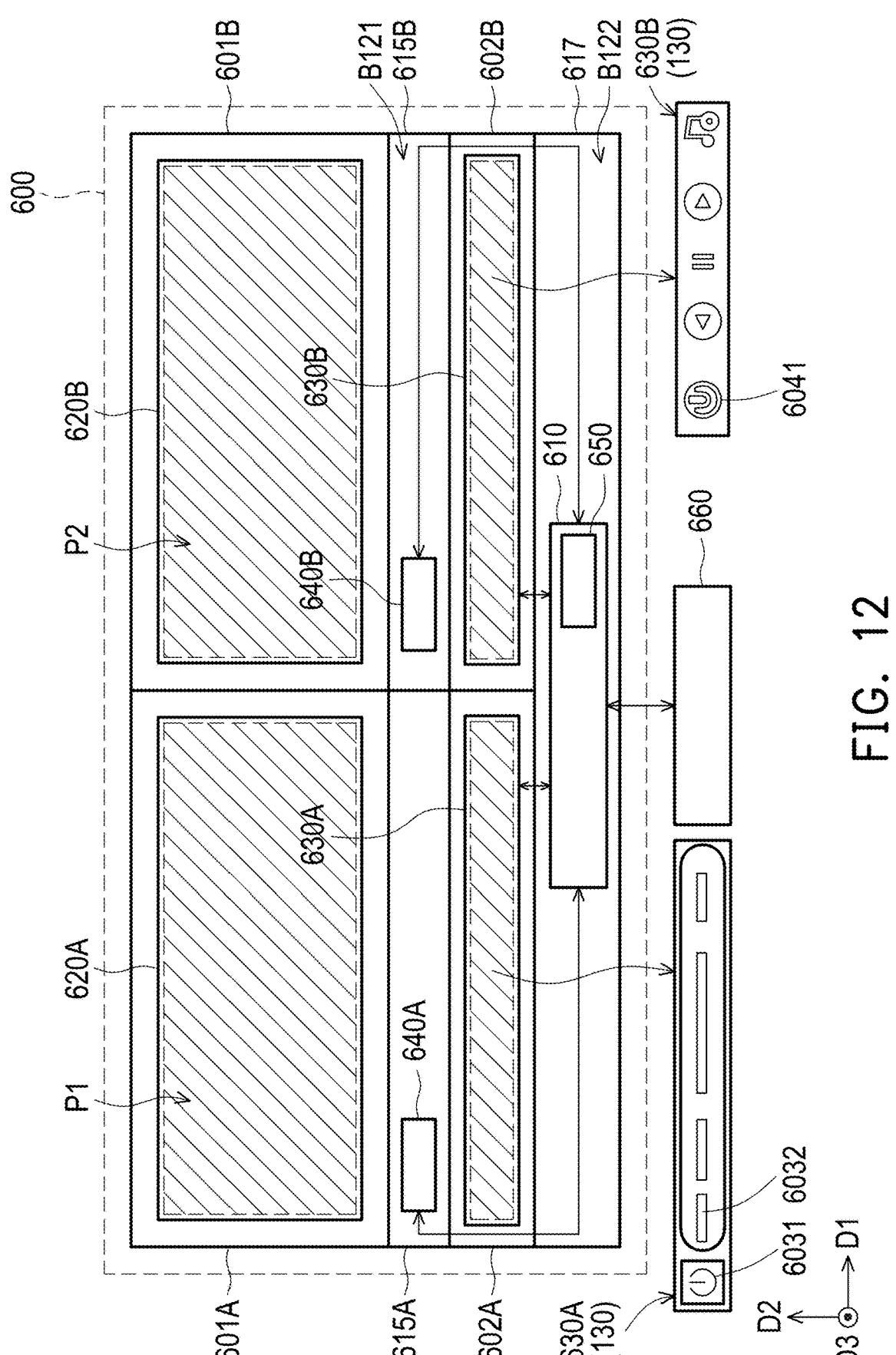
FIG. 12 is a schematic top view of an electronic device according to an embodiment of the disclosure.

In the embodiment, the second touch module 130 is exemplified by a plug-in type and may be a virtual touch module to implement virtual keys (such as multiple virtual keys 6041 shown in FIG. 12). Alternatively, the second touch module 130 may also include physical keys, knobs, sliders, etc. (such as a physical key 6031 and multiple sliders 6032 shown in FIG. 12).

As shown in FIG. 1, in the embodiment, the integrated chip 110 may drive (or process) at least one of the first touch electrodes 121_1 to 121_R and at least one of the second touch electrodes 131_1 to 131_N. The integrated chip 110 may be electrically connected to at least one of the first touch electrodes 121_1 to 121_R through a first touch signal line 104, so as to receive a first touch signal TS1 transmitted by at least one of the first touch electrodes 121_1 to 121_R. The integrated chip 110 may be electrically connected to at least one of the second touch electrodes 131_1 to 131_N through a second touch signal line 105, so as to receive a second touch signal TS2 transmitted by at least one of the second touch electrodes 131_1 to 131_N. The integrated chip 110 may process the first touch signal TS1 transmitted by at least one of the first touch electrodes 121_1 to 121_R and may process the second touch signal TS2 transmitted by at least one of the second touch electrodes 131_1 to 131_N. Furthermore, the integrated chip 110 may be electrically connected to at least one of the display electrodes 122_1 to 122_M through a display signal line 106 and drive at least one of the display electrodes 122_1 to 122_M to implement a display function. To simplify the drawing, the first touch signal line 104 and the display signal line 106 are represented by one line, which is not configured to limit the disclosure. According to some embodiments, the first touch signal line 104 and the display signal line 106 may be the same signal line or different signal lines. According to some embodiments, the integrated chip 110 may drive the first touch electrodes 121_1 to 121_R, the second touch electrodes 131_1 to 131_N, and the display electrodes 122_1 to 122_M.

In the embodiment, the first touch electrodes 121_1 to 121_R and the second touch electrodes 131_1 to 131_N may be configured to implement the same or different touch mechanisms, and the integrated chip 110 may be respectively controlled according to the respective touch mechanisms of the first touch electrodes 121_1 to 121_R and the second touch electrodes 131_1 to 131_N. For example, the first touch electrodes 121_1 to 121_R may be resistive or capacitive touch electrodes, and the second touch electrodes 131_1 to 131_N may be electrodes of physical keys, knobs, or sliders, but the disclosure is not limited thereto.

The first touch module 120 and the second touch module 130 may be disposed on the same substrate or disposed on different substrates. In FIG. 1, the second touch area 102 and the circuit configuration area 103 may be continuous areas or separate areas. For example, the second touch area 102 and the circuit configuration area 103 are separate areas, and the second touch area 102 and the circuit configuration area 103 may be in different substrates. For example, a circuit board B1 may include the circuit configuration area 103, and the second touch module 130 may be disposed on a substrate different from the circuit board B1.

In the embodiment, the first touch module 120 and the second touch module 130 may be disposed on different substrates, and the first touch electrodes 121_1 to 121_R of the first touch module 120 and the second touch electrode 131_1 of the second touch module 130 to 131_N are respectively disposed in the first touch area 101 and the second touch area 102, and are independently driven by the integrated chip 110. In other words, the first touch module 120 and the second touch module 130 may be formed as separate touch modules, so as to independently operate to implement touch functions of respective corresponding touch areas.

Specifically, the integrated chip 110 may judge whether the first touch signal TS1 is a real touch signal. When the first touch signal TS1 is the real touch signal, the integrated chip 110 may report a point and store a first image. The integrated chip 110 may judge whether the second touch signal TS2 is a real touch signal. When the second touch signal TS2 is the real touch signal, the integrated chip 110 may report a point and store a second image. The first image and the second image are configured to represent touch coordinate information in the first touch area 101 and the second touch area 102. The integrated chip 110 may send a device message content of the first image, the second image, and a human-machine interface of a relevant module to a back-end host chip (not shown, which may be electrically connected to the integrated chip 110) for use, so as to execute a corresponding function. According to some embodiments, the electronic device may be disposed in a vehicle, and the host chip may be a vehicle host chip. For example, the electronic device may include the vehicle host chip, and the integrated chip 110 may send the device message content of the first image, the second image, and the human-machine interface of the relevant module to the back-end vehicle host chip for use, so as to execute the corresponding function.

Figure 2:
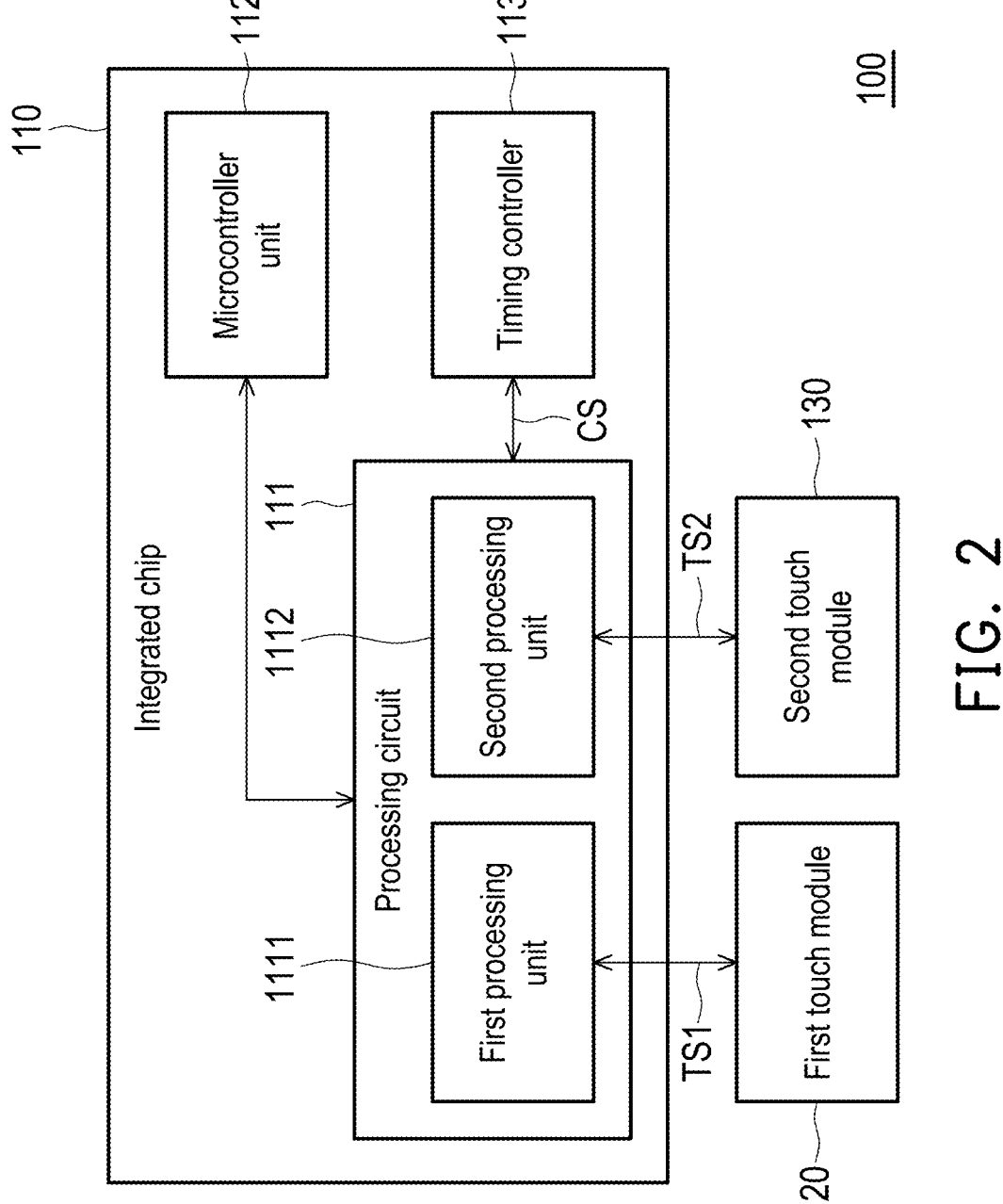
FIG. 2 is a schematic view of a circuit of an electronic device according to an embodiment of the disclosure.

FIG. 2 is a schematic view of a circuit of an electronic device according to an embodiment of the disclosure. Referring to FIG. 2, in the embodiment, the electronic device 100 includes the integrated chip 110, the first touch module 120, and the second touch module 130. The integrated chip 110 may include a processing circuit 111, a microcontroller unit (MCU) 112, and a timing controller (TCON) 113. The processing circuit 111 is electrically connected to the microcontroller unit 112 and the timing controller 113. The processing circuit 111 may include a first processing unit 1111 and a second processing unit 1112. The first processing unit 1111 is electrically connected to the first touch module 120. The second processing unit 1112 is electrically connected to the second touch module 130. In the embodiment, the first processing unit 1111 may be touch and display driver integration (TDDI). The second processing unit 1112 may be a touch sensing chip. The processing circuit 111 may communicate with the microcontroller unit 112 and the timing controller 113 through a manner such as a serial peripheral interface (SPI) or a general-purpose input/output (GPIO) pin.

In the embodiment, the timing controller 113 is configured to provide a timing signal CS to the processing circuit 111. The processing circuit 111 may obtain the timing signal CS from the timing controller 113, so that the first processing unit 1111 and the second processing unit 1112 may drive the first touch module 120 and the second touch module 130 according to the timing signal CS. The first processing unit 1111 and the second processing unit 1112 may respectively perform handshake with the microcontroller unit 112 through transmitting a synchronization signal. The first processing unit 1111 may be configured to drive the first touch module 120 and the display electrodes disposed in the same touch area as the first touch module 120. For example, referring to FIG. 1 and FIG. 4 at the same time, the first processing unit 1111 may be configured to drive the first touch electrodes 121_1 to 121_R of the first touch module 120 and the display electrodes 122_1 to 122_M disposed in the same first touch area 101 as the first touch module 120.

The second processing unit 1112 may be configured to drive the second touch module 130.

As shown in FIG. 2, specifically, the first processing unit 1111 may obtain first touch coordinates according to the first touch signal TS1 provided by the first touch module 120, and the second processing unit 1112 may obtain second touch coordinates according to the second touch signal TS2 provided by the second touch module 130. The first processing unit 1111 may send first raw data with the first touch coordinates to the microcontroller unit 112, and the second processing unit 1112 may send second raw data with the second touch coordinates to the microcontroller unit 112. The microcontroller unit 112 may synthesize the first raw data with the first touch coordinates and the second raw data with the second touch coordinates, and generate unified touch sensing data to be reported to the vehicle host chip (not shown, which may be electrically connected to the integrated chip 110), so that the vehicle host chip may execute or trigger a corresponding function according to a touch result. Moreover, the electronic device 100 of the embodiment may drive multiple touch modules (that is, the first touch module 120 and the second touch module 130) through the integrated chip 110 to effectively save the chip space.

Figure 3:
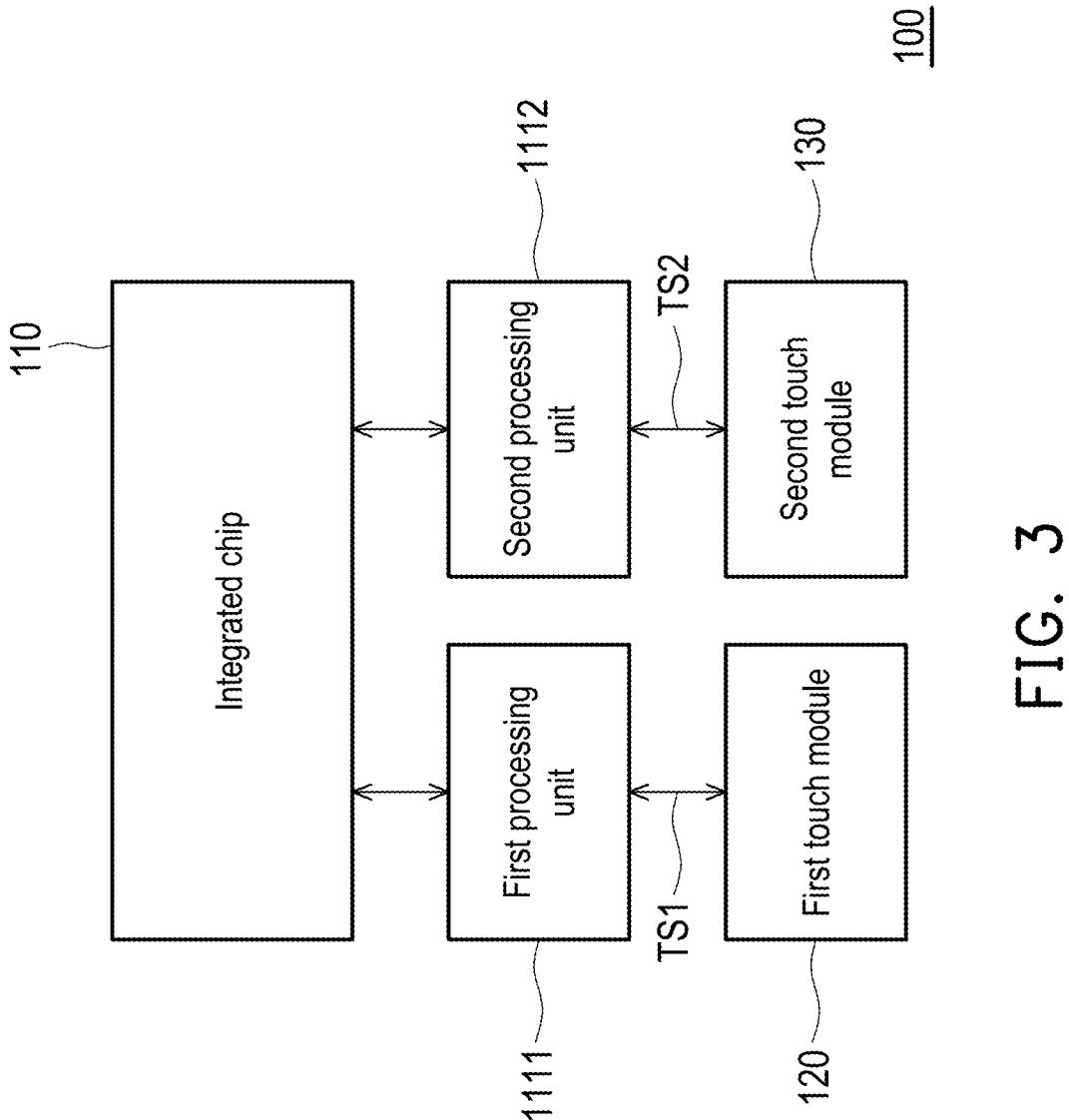
FIG. 3 is a schematic view of a circuit of an electronic device according to an embodiment of the disclosure.

FIG. 3 is a schematic view of a circuit of an electronic device according to an embodiment of the disclosure. Referring to FIG. 3, the circuit configuration manner of the electronic device 100 of the disclosure may also be implemented as shown in FIG. 3. Compared with FIG. 2, in the embodiment, the first processing unit 1111 may also be external to the integrated chip 110 and implemented as an independent chip to be electrically connected between the first touch module 120 and the integrated chip 110 and to drive the first touch module 120 and the display electrodes disposed in the same touch area as the first touch module 120, so as to obtain the first touch signal TS1 provided by the first touch module 120. Moreover, in the embodiment, the second processing unit 1112 may also be external to the integrated chip 110 and implemented as an independent chip to be electrically connected between the second touch module 130 and the integrated chip 110 and to drive the second touch module 130, so as to obtain the second touch signal TS2 provided by the second touch module 130. Therefore, the electronic device 100 of the embodiment may respectively drive different touch modules through different processing units.

Figure 4:
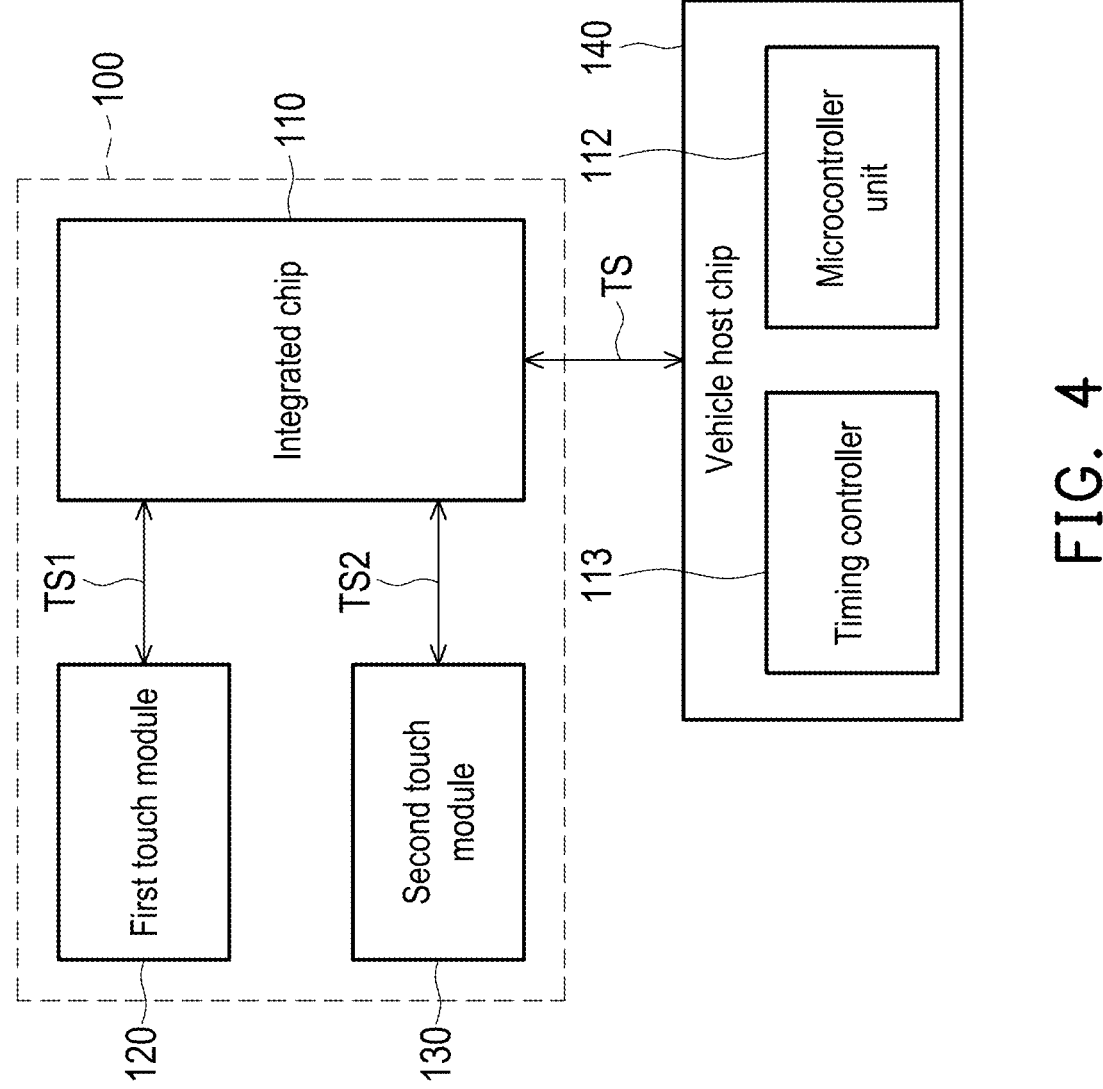
FIG. 4 is a schematic view of a circuit of an electronic device according to an embodiment of the disclosure.

FIG. 4 is a schematic view of a circuit of an electronic device according to an embodiment of the disclosure. Referring to FIG. 4, the circuit configuration manner of the electronic device 100 of the disclosure may also be implemented as shown in FIG. 4. In the embodiment, the electronic device 100 includes the integrated chip 110, the first touch module 120, and the second touch module 130. In the embodiment, the integrated chip 110 may include the first processing unit 1111 and the second processing unit 1112 as shown in the embodiment of FIG. 2 and be configured to respectively drive the first touch module 120 and the second touch module 130. The integrated chip 110 is electrically connected between a vehicle host chip 140 and the first touch module 120, and is electrically connected between the vehicle host chip 140 and the second touch module 130.

However, different from the embodiment of FIG. 2, the vehicle host chip 140 of the embodiment includes the microcontroller unit 112 and the timing controller 113. Specifically, the integrated chip 110 may obtain the first touch coordinates according to the first touch signal TS1 provided by the first touch module 120 and may obtain the second touch coordinates according to the second touch signal TS2 provided by the second touch module 130. The integrated chip 110 may send the first raw data with the first touch coordinates and the second raw data with the second touch coordinates to the vehicle host chip 140, so that the microcontroller unit 112 of the vehicle host chip 140 may synthesize the first raw data with the first touch coordinates and the second raw data with the second touch coordinates, and generate unified touch sensing data TS, so that the vehicle host chip 110 may execute or trigger a corresponding function according to the touch result. Therefore, the electronic device 100 of the embodiment may drive multiple touch modules (that is, the first touch module 120 and the second touch module 130) through the integrated chip 110 to effectively save the chip space.

Figure 5:
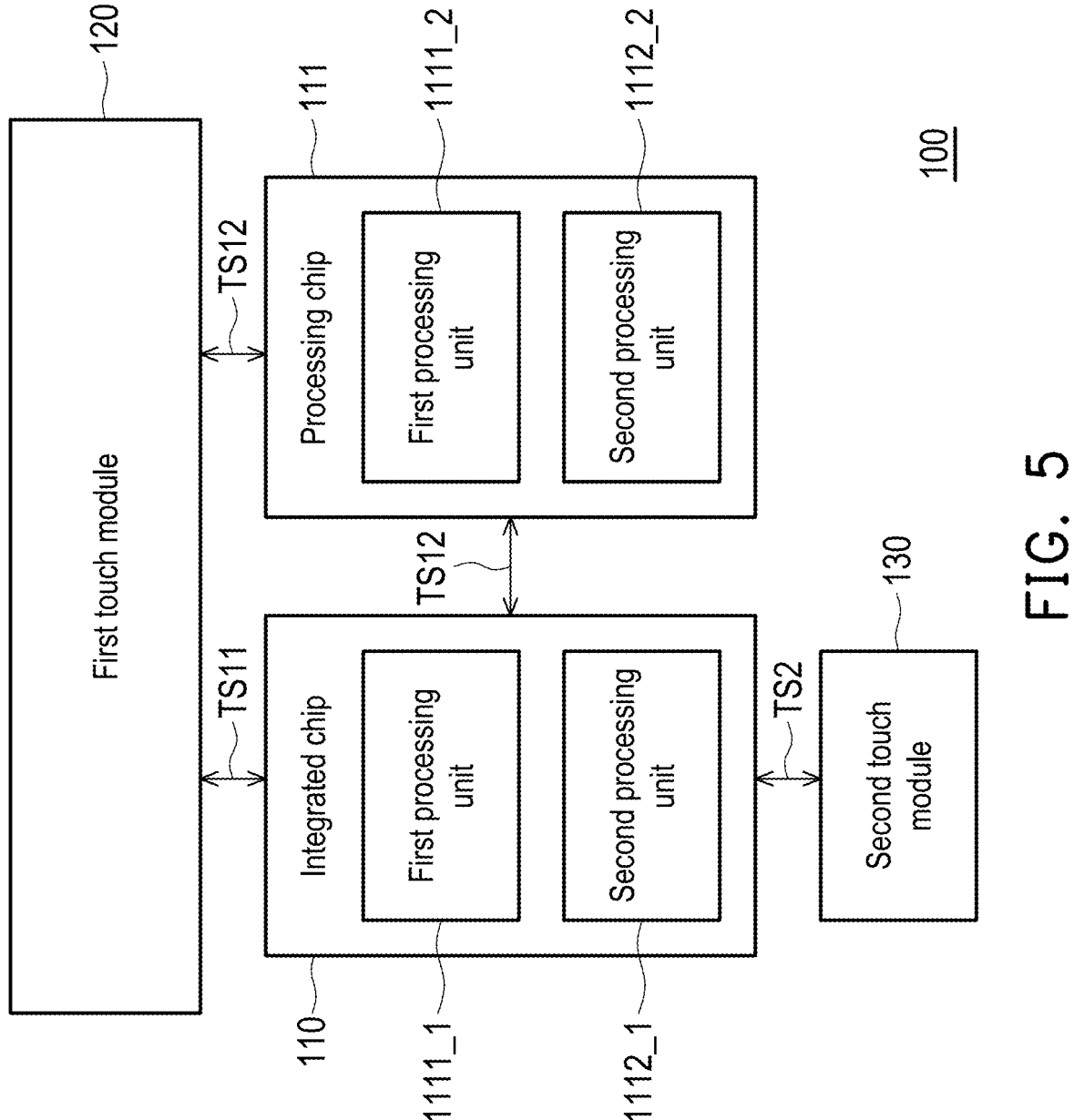
FIG. 5 is a schematic view of a circuit of an electronic device according to an embodiment of the disclosure.

FIG. 5 is a schematic view of a circuit of an electronic device according to an embodiment of the disclosure. Referring to FIG. 5, the circuit configuration manner of the electronic device 100 of the disclosure may also be implemented as shown in FIG. 5. In the embodiment, the first touch module 120 may be, for example, a large-sized touch panel (or touch display panel), and is thus driven via multiple chips. In this regard, the electronic device 100 may include the integrated chip 110, the processing chip 111, the first touch module 120, and the second touch module 130. The integrated chip 110 is electrically connected to the first touch module 120, the processing chip 111, and the second touch module 130. The processing chip 111 is also electrically connected to the first touch module 120. The integrated chip 110 may include a first processing unit 1111_1 and a second processing unit 1112_1. The processing chip 111 may include a first processing unit 1111_2 and a second processing unit 1112_2. The integrated chip 110 may be configured to process a part of the first touch electrodes, and the processing chip 111 may be configured to process another part of the first touch electrodes. In detail, the first processing unit 1111_1 in the integrated chip 110 may be configured to process a part of the first touch electrodes and a part of the display electrodes disposed in the same touch area as the first touch module 120. The first processing unit 1111_2 in the processing chip 111 may be configured to process another part of the first touch electrodes and another part of the display electrodes. The second processing unit 1112_1 in the integrated chip 110 may be configured to drive the second touch module 130. The second processing unit 1112_2 in the processing chip 111 may be inactive or configured to drive another second touch module. According to some embodiments, the processing chip 111 may be configured to process another first touch signal TS12 transmitted by at least another part of the first touch electrodes and is electrically isolated from the second touch module 130.

As shown in FIG. 5, in the embodiment, the integrated chip 110 may be used as a master IC, and the processing chip 111 may be used as a slave IC. Specifically, the first processing unit 1111_1 of the integrated chip 110 may obtain the first touch coordinates according to a first touch signal TS11 provided by a part of the first touch electrodes of the first touch module 120, and the first processing unit 1111_2 of the processing chip 111 may obtain another first touch coordinates according to another first touch signal TS12 provided by another part of the first touch electrodes of the first touch module 120. The processing chip 111 may be electrically isolated from the second touch module 130. The second processing unit 1112_1 of the integrated chip 110 may obtain the second touch coordinates according to the second touch signal TS2 provided by the second touch electrodes of the second touch module 130. The processing chip 111 may send the raw data with another first touch coordinate to the integrated chip 110. In this way, the integrated chip 110 may perform data synthesis on the first raw data with the first touch coordinates, another first raw data with another first touch coordinates, and the second raw data with the second touch coordinates, and generate unified touch sensing data to be reported to the vehicle host chip, so that the vehicle host chip may execute or trigger a corresponding function according to the touch result. Alternatively, the integrated chip 110 may also send the first raw data with the first touch coordinates, another first raw data with another first touch coordinates, and the second raw data with the second touch coordinates to the vehicle host chip to perform data synthesis by the vehicle host chip, so as to generate the unified touch sensing data. In this regard, the electronic device 100 of the embodiment may jointly process touch sensing data of the first touch module 120 and the second touch module 130 through the integrated chip 110 without the need for an additional processing circuit. Therefore, the electronic device 100 of the embodiment can effectively save the number of chips.

Based on the above, the first touch module 120 of the embodiment may provide the touch and display functions, and may provide the additional touch functions of the virtual touch keys, the physical touch keys, the knobs, or the sliders together with the second touch module 130, so as to achieve an application structure with multiple functions. Moreover, the touch data of the first touch module 120 and the second touch module 130 may be processed through the same processing circuit or integrated chip to generate the unified touch data for use by the back-end host chip. In this way, the number of chips and the chip space can be effectively saved.

Figure 6:
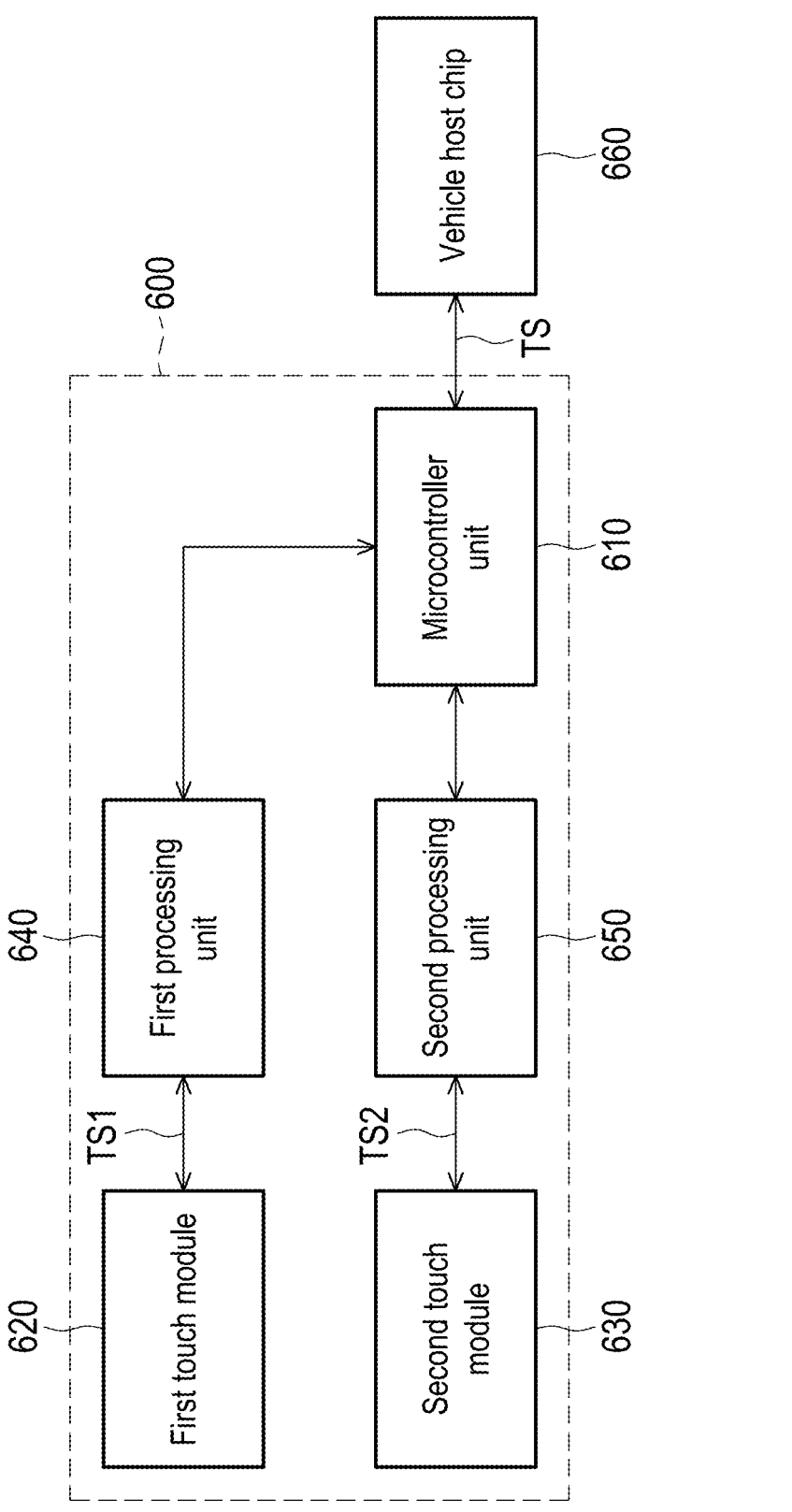
FIG. 6 is a schematic view of a circuit of an electronic device according to an embodiment of the disclosure.
Figure 7:
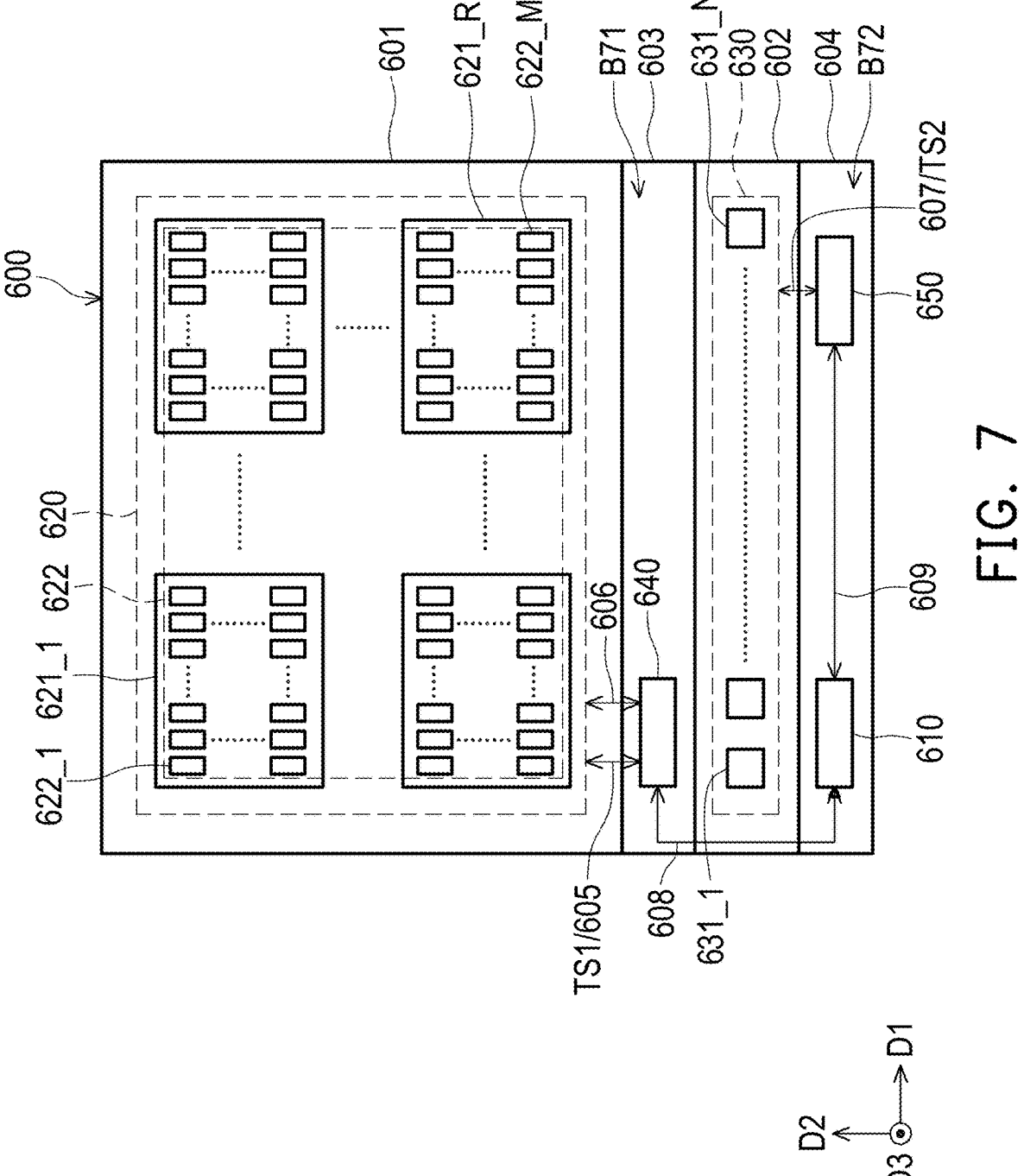
FIG. 7 is a schematic top view of an electronic device according to an embodiment of the disclosure.

FIG. 6 is a schematic view of a circuit of an electronic device according to an embodiment of the disclosure. FIG. 7 is a schematic top view of an electronic device according to an embodiment of the disclosure. Referring to FIG. 6, an electronic device 600 includes a microcontroller unit 610, a first touch module 620, a second touch module 630, a first processing unit 640, a second processing unit 650, and a vehicle host chip 660. The microcontroller unit 610 is electrically connected to the first processing unit 640, the second processing unit 650, and the vehicle host chip 660. The first processing unit 640 is also electrically connected to the first touch module 620. The second processing unit 650 is also electrically connected to the second touch module 630. The first processing unit 640 is configured to drive the first touch module 620. The second processing unit 650 is configured to drive the second touch module 630. In the embodiment, the electronic device 600 may be, for example, a vehicle display device and is configured to connect to other electronic equipment on the vehicle, so as to provide, for example, functions such as audio and video, driving assistance, and/or peripheral equipment control in the vehicle.

In the embodiment, the first processing unit 640 may be touch and display driver integration (TDDI). The second processing unit 650 may be a touch sensing chip. The first processing unit 640 and the second processing unit 650 may respectively communicate with the microcontroller unit 610 through a manner such as a serial peripheral interface or a general-purpose input/output pin. The microcontroller unit 610 may also communicate with the vehicle host chip 660 through a manner such as a serial peripheral interface or a general-purpose input/output pin. In an embodiment, the first processing unit 640 may also be a pure touch sensing chip.

Referring to FIG. 6 and FIG. 7, the electronic device 600 may include a first touch area 601, a second touch area 602, a first circuit configuration area 603, and a second circuit configuration area 604. It is worth noting that the circuit configuration area described in the embodiment refers to a non-touch/non-display area adjacent to a touch/display area and is configured to provide a relevant driving circuit/chip. The circuit configuration area described in the disclosure may be a different area on the same panel or a different area on a different panel from the touch area and/or the display area, but the disclosure is not limited thereto and may be determined according to the type of the touch/display panel adopted. In the embodiment, touch surfaces (and display surfaces) of the first touch area 601 and the second touch area 602 may be parallel to the plane formed by the direction D1 and the direction D2, and the first touch area 601 may emit display light toward the direction D3. Alternatively, in an embodiment, the touch surfaces (and the display surfaces) of the first touch area 601 and/or the second touch area 602 may be curved surfaces. In the embodiment, the electronic device 600 may provide the touch and display functions through the first touch area 601, and the electronic device 600 may provide the touch function through the second touch area 602. The electronic device 600 of the embodiment may respectively drive different touch modules through different processing units. According to some embodiments, multiple display electrodes 622_1 to 622_M are separated from the second touch area 602. According to some embodiments, the display electrodes 622_1 to 622_M are separated from the first circuit configuration area 603.

Figure 8:
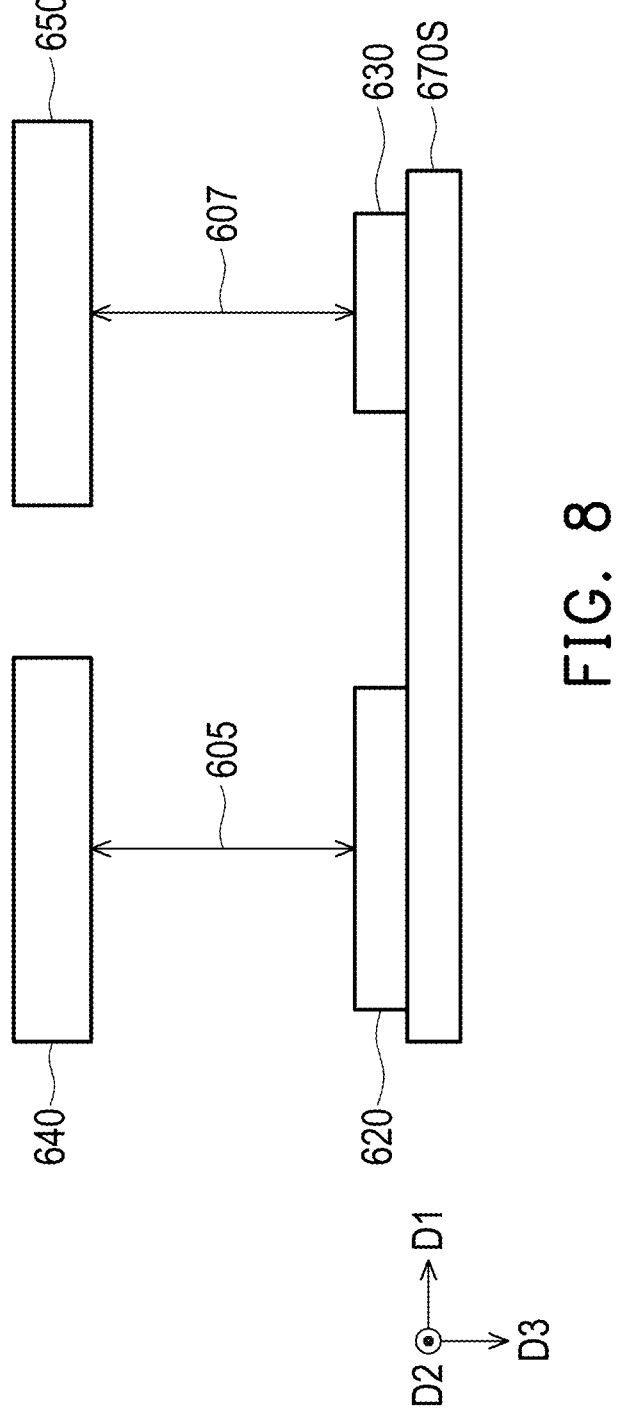
FIG. 8 is a schematic cross-sectional view of an electronic device according to an embodiment of the disclosure.

Also referring to FIG. 8, FIG. 8 is a schematic cross-sectional view of an electronic device according to an embodiment of the disclosure. As shown in FIG. 8, the first touch module 620 and the second touch module 630 may be disposed on the same substrate 670S. That is, multiple first touch electrodes 621 and multiple second touch electrodes 631 may be disposed on the same substrate. The first touch module 620 and the second touch module 630 may be disposed on the same substrate 670S. Alternatively, although not shown in the drawing, the first touch module 620 and the second touch module 630 may be disposed on different substrates. Referring to FIG. 7 again, the areas 601, 602, 603, and 604 may be continuous or may be separated. According to some embodiments, the first touch area 601 and the circuit configuration area 603 may be separate areas. For example, the first touch area 601 and the circuit configuration area 603 may be in different substrates, wherein a circuit board B71 may include the circuit configuration area 603. For example, the first touch electrodes 621 in the first touch area 601 may be disposed on a substrate, and the first processing unit 640 may be disposed on the circuit board B71 different from the substrate where the first touch electrodes 621 are located. According to some embodiments, the second touch area 602 and the circuit configuration area 604 may be separate areas. For example, the second touch area 602 and the circuit configuration area 604 may be in different substrates, wherein a circuit board B72 may include the circuit configuration area 604. For example, the second touch electrodes 631 in the second touch area 602 may be disposed on a substrate, and the second processing unit 650 may be disposed on the circuit board B72 different from the substrate where the second touch electrodes 631 are located. For other contents of the circuit configuration areas and the relationship between the circuit configuration areas and the touch areas, reference may be made to the relevant contents mentioned above in the specification, which will not be repeated here.

Based on the above, the first touch module 620 of the embodiment may provide the touch and display functions and may provide the additional touch functions of the virtual touch keys, the physical touch keys, the knobs, or the sliders together with the second touch module 630, so as to achieve an application structure with multiple functions. Moreover, the second touch module 630 may be driven by the second processing unit 650 (as the touch sensing chip). In this way, when the electronic device 600 is expanded and applied to a larger-sized panel (for example, an extra-large-sized panel), the first processing unit 640 (as TDDI) does not need to add additional pads to couple and drive second touch electrodes 631_1 to 631_N of the second touch module 630, but couples and drives the second touch electrodes 631_1 to 631_N of the second touch module 630 through the second processing unit 650.

According to some embodiments, the first processing unit 640 is configured to drive the first touch module 620 and is configured to drive a display layer 622 (including the display electrodes 622_1 to 622_M). The cost of the first processing unit 640 is generally higher than the cost of the second processing unit 650. Therefore, the electronic device 600 of the embodiment can effectively save the number of pads of the first processing unit 640, thereby reducing the circuit area of the first processing unit 640 and/or reducing the cost of the first processing unit 640. The second processing unit 650 may adopt a smaller-sized chip (smaller than the first processing unit 640) to have scalability. Therefore, the electronic device 600 of the embodiment also has the advantage of reducing the cost of the overall system development.

As shown in FIG. 7, in the embodiment, the first touch module 620 may be disposed in the first touch area 601 and includes multiple first touch electrodes 621_1 to 621_R. The second touch module 630 may be disposed in the second touch area 602 and includes multiple second touch electrodes 631_1 to 631_N. The display electrodes 622_1 to 622_M may be disposed in the first touch area 601, but not disposed in the second touch area 602. The display electrodes 622_1 to 622_M and the second touch area 602 may be separated. For related content of the second touch module 630, reference may be made to the content mentioned above in the specification, which will not be repeated here.

The relative structural relationship between the first touch module 620 and the display electrodes may be in-cell touch, on-cell touch, or out-cell touch, and reference may be made to the content mentioned above in the specification, which will not be repeated here. In some embodiments, the first touch module 620 may be an in-cell touch and on-cell touch module, which means that the touch electrodes and the display electrodes are disposed in the same panel (that is, the touch display panel) or in the same touch module. In other words, the first touch module 620 may include the display layer 622, and the display layer 622 may include the display electrodes 622_1 to 622_M.

In the embodiment, the first touch module 620 and the second touch module 630 may be disposed on different substrates, and the first touch electrodes 621_1 to 621_R of the first touch module 620 and the second touch electrodes 631_1 to 631_N of the second touch module 630 are respectively disposed in the first touch area 601 and the second touch area 602, and are independently driven by the first processing unit 640 and the second processing unit 650. In other words, the first touch module 620 and the second touch module 630 may be formed as separate touch modules, so as to independently operate to implement the touch functions of the respective corresponding touch areas.

In the embodiment, the first circuit configuration area 603 is disposed between the first touch area 601 and the second touch area 602. The first processing unit 640 is disposed in the first circuit configuration area 603. In the embodiment, the first processing unit 640 may be electrically connected to at least one of the first touch electrodes 621_1 to 621_R through a first touch signal line 605, so as to receive the first touch signal TS1 transmitted by at least one of the first touch electrodes 621_1 to 621_R. The first touch signal line 605 is electrically connected between the first processing unit 640 and at least one of the first touch electrodes 621_1 to 621_R.

In the embodiment, the first processing unit 640 may be electrically connected to at least one of the display electrodes 622_1 to 622_M through a display signal line 606 and drive the display electrodes 622_1 to 622_M to implement the display function. The display signal line 606 is electrically connected between the first processing unit 640 and at least one of the display electrodes 622_1 to 622_M.

In the embodiment, the second circuit configuration area 604 is disposed on one side of the second touch area 602 and is not adjacent to the first touch area 601. The second processing unit 650 is disposed in the second circuit configuration area 604. The second processing unit 650 may be electrically connected to at least one of the second touch electrodes 631_1 to 631_N through a second touch signal line 607, so as to receive the second touch signal TS2 transmitted by at least one of the second touch electrodes 631_1 to 631_N. The second touch signal line 607 is electrically connected between the second processing unit 650 and at least one of the second touch electrodes 631_1 to 631_N.

In the embodiment, the microcontroller unit 610 may be disposed in the second circuit configuration area 604. The microcontroller unit 610 may be a full digital IC and may be electrically connected to the first processing unit 640 through a first signal line 608 and electrically connected to the second processing unit 650 through a second signal line 609. In the embodiment, the second touch module 630 may include an out-cell touch panel and may be a virtual touch module to implement virtual keys. Alternatively, the second touch module 630 may also include physical keys, knobs, sliders, etc. In the embodiment, the first signal line 608 and the second signal line 609 may be respectively implemented in the manner of a flexible printed circuit (FPC), but the disclosure is not limited thereto.

In the embodiment, the first processing unit 640 may obtain the first touch coordinates according to the first touch signal TS1 provided by the first touch module 620. The second processing unit 650 may obtain the second touch coordinates according to the second touch signal TS2 provided by the second touch module 630. The first processing unit 640 may provide the first touch coordinates to the microcontroller unit 610. The second processing unit 650 may provide the second touch coordinates to the microcontroller unit 610. The microcontroller unit 610 may synthesize the first raw data with the first touch coordinates and the second raw data with the second touch coordinates, and generate the unified touch sensing data. The microcontroller unit 610 may further send the unified touch sensing data to the vehicle host chip, so that the vehicle host chip may execute or trigger a corresponding function according to the touch result. Moreover, the first processing unit 640 may also drive the display electrodes 622_1 to 622_M through the display signal line 606 to implement the display function.

FIG. 8 is a schematic cross-sectional view of an electronic device according to an embodiment of the disclosure. Referring to FIG. 7 and FIG. 8, in the embodiment, the first touch electrodes 621_1 to 621_R of the first touch module 620 and the second touch electrodes 631_1 to 631_N of the second touch module 630 are disposed on the same substrate 670S. The first processing unit 640 may be electrically connected to the first touch module 620 through the first touch signal line 605. The second processing unit 650 may be electrically connected to the second touch module 630 through the second touch signal line 607.

Figure 9:
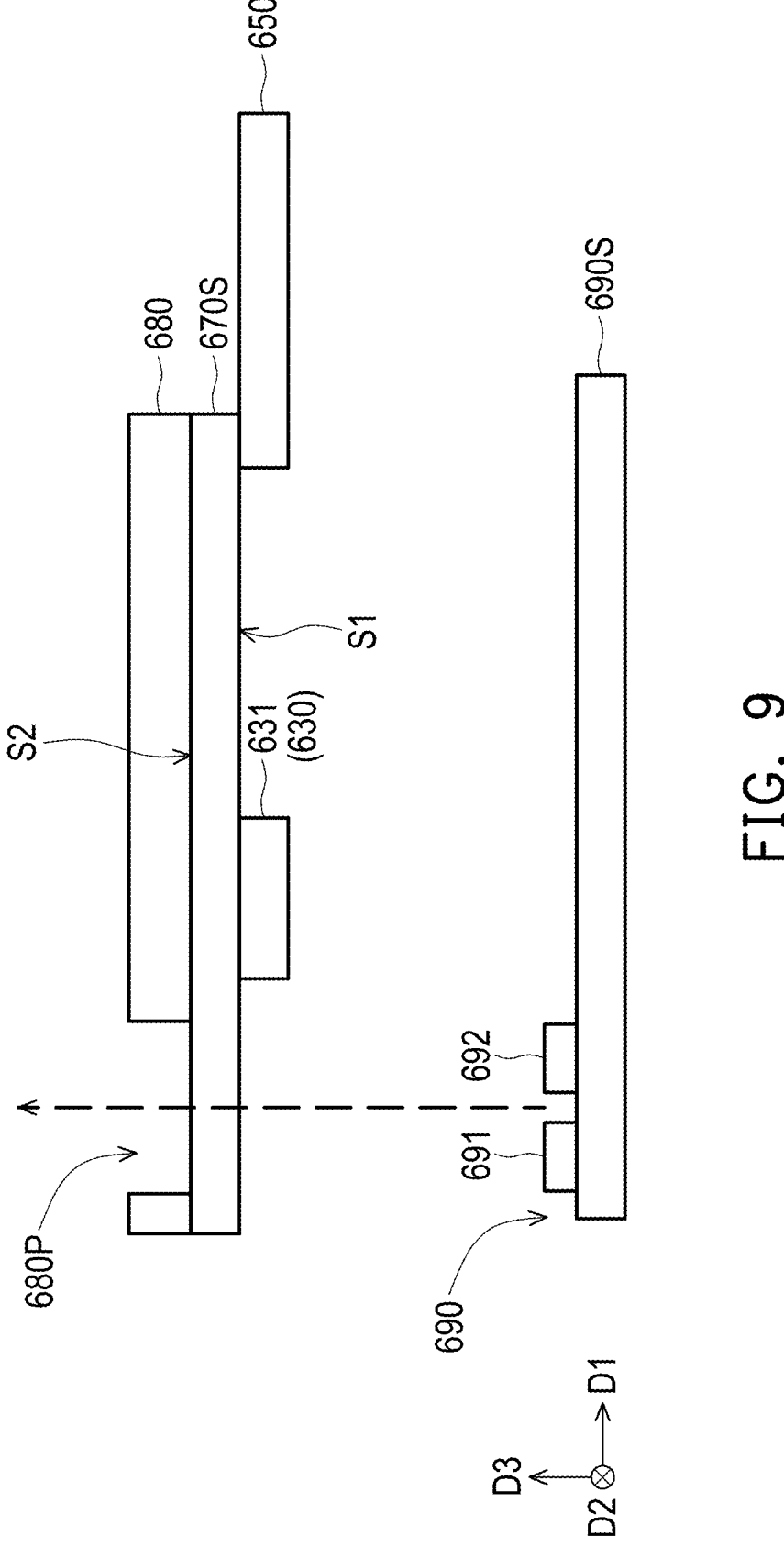
FIG. 9 is a schematic cross-sectional view of an electronic device according to an embodiment of the disclosure.

FIG. 9 is a schematic cross-sectional view of an electronic device according to an embodiment of the disclosure. Referring to FIG. 7 and FIG. 9, taking the second touch module 630 as a virtual touch module as an example, the following describes the implementation structure of the second touch module 630. In the embodiment, the second touch module 630 and the second processing unit 650 may be disposed on the same substrate 670S. The touch electrode 631 of the second touch module 630 may be disposed on a first side S1 of the substrate 670S. The substrate 670S may be parallel to a plane formed by extending the direction D1 and the direction D2. Moreover, the second processing unit 650 for driving the touch electrode 631 may be disposed on a printed circuit board (PCB) or a flexible printed circuit (FPC) and is also disposed on the side S1 of the substrate 670S. A protective layer 680 may be disposed on a second side S2 of the substrate 670S. The first side S1 and the second side S2 are opposite sides. A circuit board 690 may be disposed below the substrate 670S. The circuit board 690 may include a substrate 690S and light emitting units 691 and 692 disposed on the substrate 690S. The light emitting units 691 and 692 emit light toward the substrate 670S along the direction D3 to serve as, for example, light signals of virtual keys. The light emitting units 691 and 692 may emit light upward via an opening 680P of the protective layer 680. The light emitting units 691 and 692 may be, for example, light emitting diode (LED) units, but the disclosure is not limited thereto. In this way, a user may view the light signal of the virtual key through the substrate 670S and may perform a touch operation on the protective layer 680.

Figure 10:
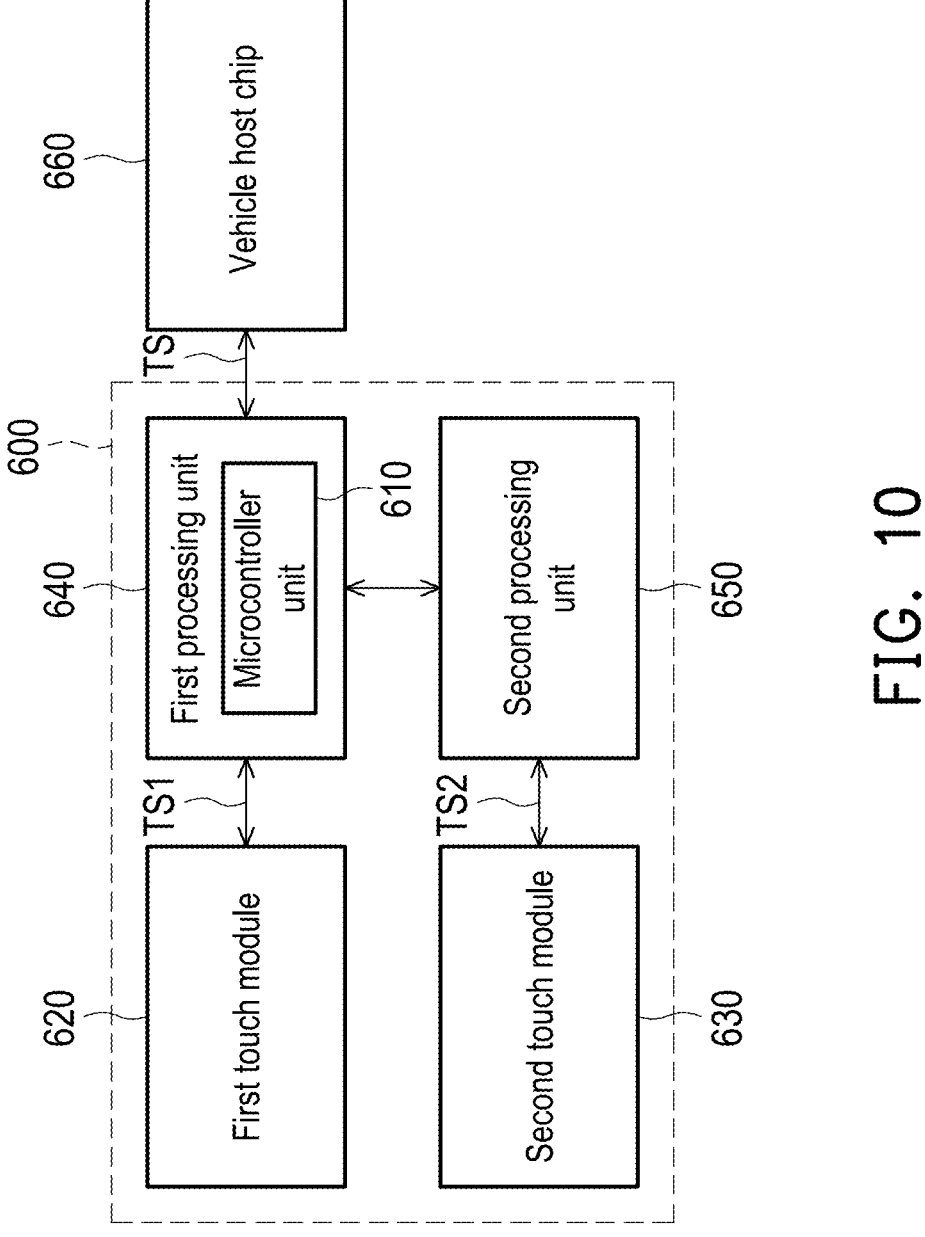
FIG. 10 is a schematic view of a circuit of an electronic device according to an embodiment of the disclosure.

FIG. 10 is a schematic view of a circuit of an electronic device according to an embodiment of the disclosure. Referring to FIG. 10, the circuit configuration manner of the electronic device 600 of the disclosure may also be implemented as shown in FIG. 10. The electronic device 600 includes the microcontroller unit 610, the first touch module 620, the second touch module 630, the first processing unit 640, the second processing unit 650, and the vehicle host chip 660. Different from FIG. 6, the microcontroller unit 610 may be disposed in the first processing unit 640. The first processing unit 640 is electrically connected to the first touch module 620, the second processing unit 650, and the vehicle host chip 660. The second processing unit 650 is also electrically connected to the second touch module 630. The first processing unit 640 is configured to drive the first touch module 620. The second processing unit 650 is configured to drive the second touch module 630. In the embodiment, the first processing unit 640 may be touch and display driver integration. The second processing unit 650 may be a touch sensing chip. The first processing unit 640 may communicate with the vehicle host chip 660 through a manner such as a serial peripheral interface or a general-purpose input/output pin.

In the embodiment, the first processing unit 640 may obtain the first touch coordinates according to the first touch signal TS1 provided by the first touch module 620. The second processing unit 650 may obtain the second touch coordinates according to the second touch signal TS2 provided by the second touch module 630. The second processing unit 650 may provide the second touch coordinates to the first processing unit 640. The microcontroller unit 610 of the first processing unit 640 may synthesize the first raw data with the first touch coordinates and the second raw data with the second touch coordinates, and generate the unified touch sensing data TS. The first processing unit 640 may further send the unified touch sensing data TS to the vehicle host chip 660, so that the vehicle host chip 660 may execute or trigger a corresponding function according to the touch result. In this regard, the electronic device 600 of the embodiment may jointly process the touch sensing data of the first touch module 620 and the second touch module 630 through the first processing unit 640 without the need for an additional processing circuit. Therefore, the electronic device 600 of the embodiment can effectively save the number of chips.

Figure 11:
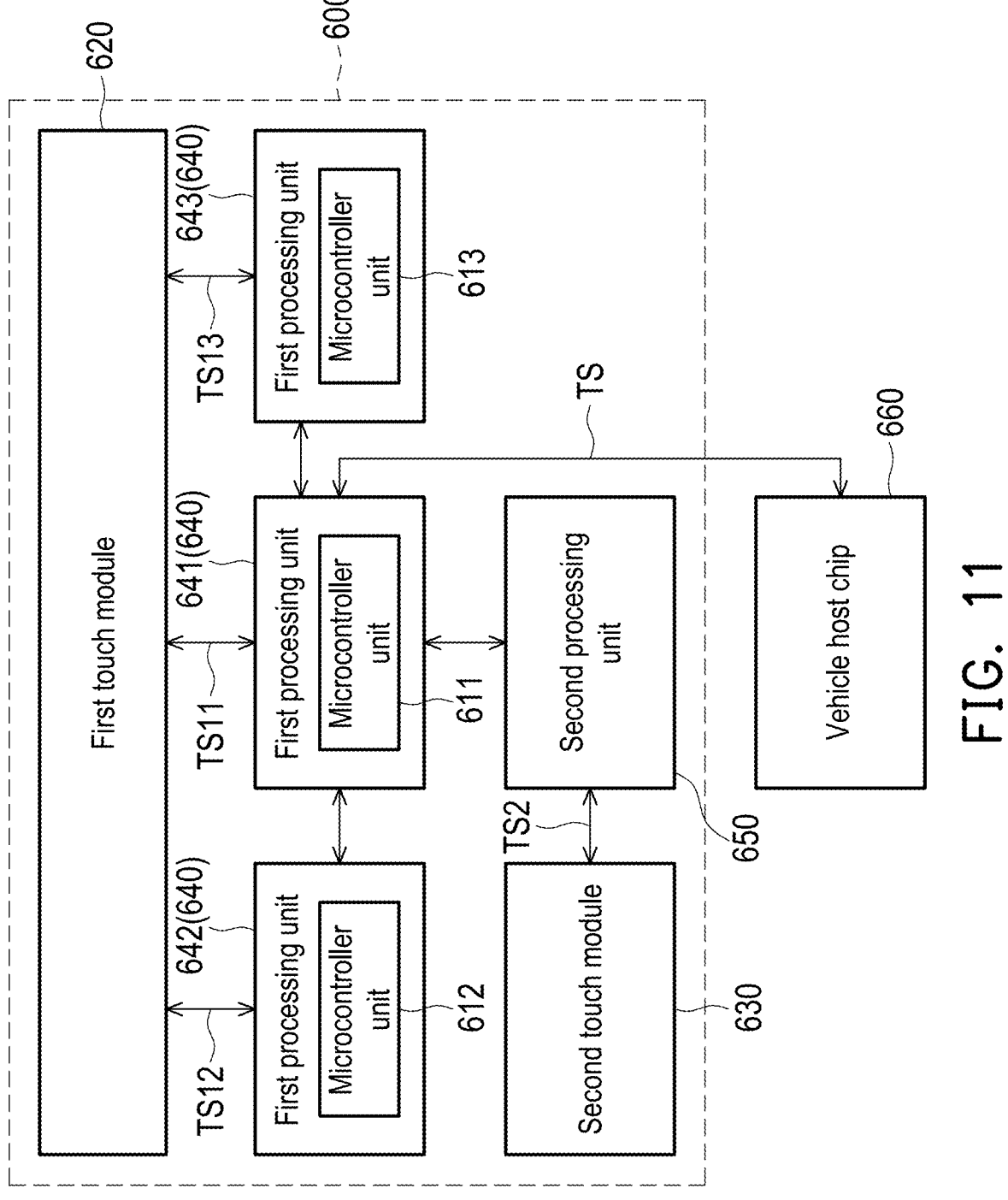
FIG. 11 is a schematic view of a circuit of an electronic device according to an embodiment of the disclosure.

FIG. 11 is a schematic view of a circuit of an electronic device according to an embodiment of the disclosure. Referring to FIG. 11, the circuit configuration manner of the electronic device 600 of the disclosure may also be implemented as shown in FIG. 11. In the embodiment, the electronic device 600 may be large in size and thus requires multiple chips to be driven. For example, the electronic device 600 includes at least two first processing units, which are electrically connected to the first touch module 620. The number of the first processing unit 640 may be greater than the number of the second processing unit 650. As shown in FIG. 11, the electronic device 600 may include multiple first processing units 641 to 643, the second processing unit 650, the first touch module 620, and the second touch module 630. The first processing unit 641 is electrically connected to the first touch module 620, the first processing units 642 and 643, the second processing unit 650, and the vehicle host chip 660. The second processing unit 650 is also electrically connected to the second touch module 630. The first processing units 641 to 643 may be respectively be touch and display driver integration or a pure touch sensing chip. The first processing units 641 to 643 may be configured to drive the first touch module 620. The second processing unit 650 may be configured to drive the second touch module 630.

In the embodiment, the first processing unit 641 may serve as a master IC, and the first processing units 642 and 643 may serve as slave ICs. Specifically, the first processing units 641 to 643 may respectively obtain multiple first touch coordinates according to multiple first touch signals TS11 to TS13 provided by different first touch electrodes of the first touch module 620. The second processing unit 650 may obtain the second touch coordinates according to the second touch signal TS2 provided by the second touch electrode of the second touch module 630. The first processing units 642 and 643 may respectively send multiple first raw data with different first touch coordinates to the first processing unit 641, and the second processing unit 650 may send the raw data with the second touch coordinates to the first processing unit 641. In this way, a microcontroller unit 611 of the first processing unit 641 may perform data synthesis on the first raw data with different first touch coordinates and the second raw data with the second touch coordinates, and generate the unified touch sensing data TS to be reported to the vehicle host chip 660, so that the vehicle host chip 660 may execute or trigger a corresponding function according to the touch result. Alternatively, the first processing unit 641 may also send the first raw data with different first touch coordinates and the second raw data with the second touch coordinates to the vehicle host chip 660, so that the vehicle host chip 660 performs data synthesis to generate the unified touch sensing data.

In this regard, the first processing unit 641 may serve as the master IC, and the first processing units 642 and 643 may serve as the slave ICs. Bonding pads on the first processing units 642 and 643 may be reduced or not required. That is, the number of the bonding pads on the first processing units 642 and 643 may be less than the number of bonding pads on the first processing unit 641. The electronic device 600 of the embodiment may jointly process the touch sensing data of the first touch module 620 and the second touch module 630 through one of the first processing units without the need for an additional processing circuit. Therefore, the electronic device 600 of the embodiment can effectively save the number of chips.

FIG. 12 is a schematic top view of an electronic device according to an embodiment of the disclosure. Referring to FIG. 12, different from the embodiment of FIG. 7, the microcontroller unit 610 of the embodiment may be integrated with the second processing unit 650 into a full digital IC. The electronic device 600 may include two first touch areas 601A and 601B, two second touch areas 602A and 602B, two first circuit configuration areas 615A and 615B, and a second circuit configuration area 617. It is worth noting that the circuit configuration area described in the embodiment refers to a non-touch/non-display area adjacent to a touch/display area and is configured to provide a relevant driving circuit/chip. The circuit configuration area described in the disclosure may be a different area on the same panel or a different area on a different panel from the touch area and/or the display area, but the disclosure is not limited thereto and may be determined according to the type of the touch/display panel adopted. In the embodiment, the first touch area 601A may display a first screen P1 and may, for example, provide a driver with the touch operation. The first touch area 601B may display a second screen P2 and may, for example, provide a passenger with the touch operation. The second touch area 602A may, for example, provide the driver with the touch operation. The second touch area 602B may, for example, provide the passenger with the touch operation.

It is worth noting that in an embodiment, areas of the first touch area 601A and the first touch area 601B may be different, and other touch areas may be further added. Moreover, areas, the form of keys (for example, virtual keys, physical keys, knobs, sliders, etc.), and the number of keys of the second touch area 602A and the second touch area 602B may also be different. For example, as shown in FIG. 12, the second touch area 602A may include a physical key 6031 and multiple sliders 6032, wherein the physical key 6031 and the sliders 6032 may be, for example, used by the driver to turn on or turn off a vehicle air conditioner, adjust an air volume of the vehicle air conditioner, etc. through the touch operation, and the second touch area 602B may include multiple virtual keys 6041, wherein the virtual keys 6041 may be, for example, used by a front passenger for a relevant function such as playing video and audio through the touch operation.

In the embodiment, the first touch module 620A may be disposed in the first touch area 601A and includes multiple first touch electrodes. The first touch module 620A may be disposed in the first touch area 601B and includes multiple other first touch electrodes. The second touch module 630A may be disposed in the second touch area 602A and includes multiple second touch electrodes. The second touch module 630B may be disposed in the second touch area 602B and includes multiple other second touch electrodes. In the embodiment, the first touch modules 620A and 620B may respectively include an in-cell touch panel or an on-cell touch panel. In the embodiment, the second touch modules 630A and 630B may respectively include an out-cell touch panel and may be virtual touch modules to implement virtual keys. Alternatively, at least one of the second touch modules 630A and 630B may also include physical keys, knobs, sliders, etc.

In the embodiment, the first circuit configuration area 615A is disposed between the first touch area 601A and the second touch area 602A. The first circuit configuration area 615B is disposed between the first touch area 601B and the second touch area 602B. The first processing unit 640A is disposed in the first circuit configuration area 615A. The first processing unit 640B is disposed in the first circuit configuration area 615B. In the embodiment, the first processing unit 640A may be electrically connected to the first touch module 620A through a first touch signal line to receive a first touch signal. The first processing unit 640B may be electrically connected to the first touch module 620B through another first touch signal line to receive another first touch signal. In the embodiment, the microcontroller unit 610 may be disposed in the second circuit configuration area 617 and may be a full digital IC. The microcontroller unit 610 may be electrically connected to the first processing units 640A and 640B, the second touch modules 630A and 630B, and the vehicle host chip 660. The second processing unit 650 is disposed in the microcontroller unit 610 (for example, a full digital IC). In an embodiment, the first processing units 640A and 640B may be, for example, analog ICs implemented by adopting chip on film (COF) technology, but the disclosure is not limited thereto.

In the embodiment, the first processing units 640A and 640B may respectively obtain multiple first touch coordinates according to multiple first touch signals provided by the first touch modules 620A and 620B. The second processing unit 650 may obtain multiple second touch coordinates according to multiple second touch signals provided by the second touch modules 630A and 630B. The first processing units 640A and 640B may provide the first touch coordinates to the microcontroller unit 610. The microcontroller unit 610 may synthesize multiple first raw data with different first touch coordinates and multiple second raw data with different second touch coordinates, and generate the unified touch sensing data. The microcontroller unit 610 may further send the unified touch sensing data to the vehicle host chip 660, so that the vehicle host chip 660 may execute or trigger a corresponding function according to the touch result.

Figure 13:
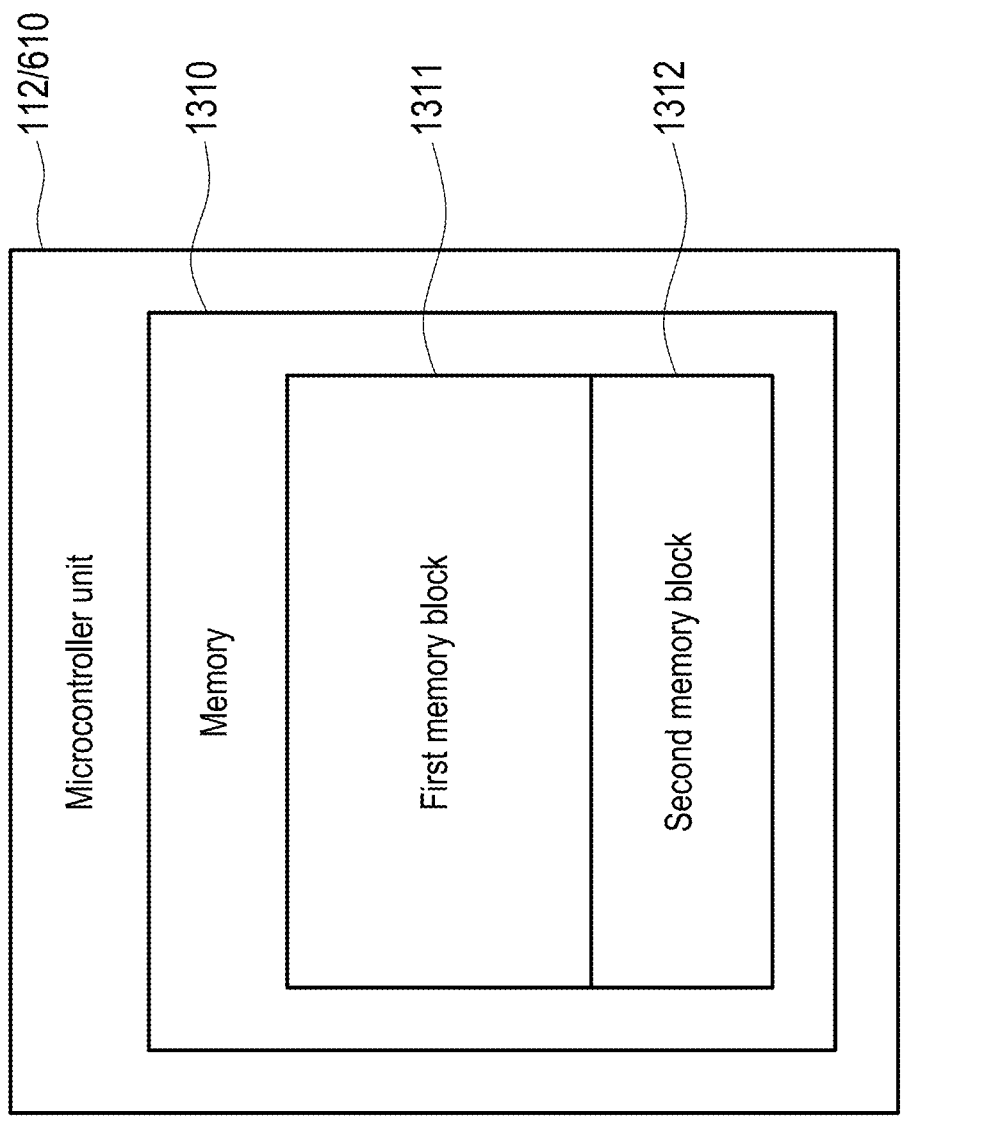
FIG. 13 is a schematic view of a microcontroller unit according to an embodiment of the disclosure.

FIG. 13 is a schematic view of a microcontroller unit according to an embodiment of the disclosure. Referring to FIG. 13, the microcontroller unit of various embodiments of the disclosure may be, for example, implemented as the microcontroller unit 112/610 of FIG. 13. In the embodiment, the microcontroller unit 112/610 may include a memory 1310, and the memory 1310 may include a first memory block 1311 and a second memory block 1312. In the embodiment, the first raw data of the first touch coordinates (that is, the first image) of the above embodiments may be stored in a fixed memory block of the first memory block 1311, the second raw data of the second touch coordinates (that is, the second image) of the above embodiments may be stored in a fixed memory block of the second memory block 1312, and the number of the second memory block 1312 may increase according to the type of the second touch module (for example, virtual keys, physical keys, knobs, etc.), but the disclosure is not limited thereto.

Specifically, when the driver or the front passenger performs the touch operation in the first touch area and the second touch area described in the above embodiments, the first processing unit and the second processing unit described in the above embodiments may respectively generate the first raw data with the first touch coordinates and the second raw data with the second touch coordinates. For example, referring to FIG. 12, when the driver performs the touch operation in the first touch area 601A or the second touch area 602A (such as touching a position of the first screen P1 or touching the physical key 6031 or the slider 6032 in the second touch area 602A), the first processing unit 640A or the second processing unit 650 may generate the first raw data with the first touch coordinates or the second raw data with the second touch coordinates. Moreover, when the front passenger performs the touch operation in the first touch area 601B or the second touch area 602B (such as touching a position of the second screen P2 or touching the virtual key 6041 in the second touch area 602B), the first processing unit 640B or the second processing unit 650 may generate the first raw data with the first touch coordinates or the second raw data with the second touch coordinates.

In the embodiment, the microcontroller unit 112/610 may store the first raw data with the first touch coordinates in the first memory block 1311 and may store the second raw data with the second touch coordinates in the second memory block 1312. In the embodiment, the microcontroller unit 112/610 may edit and integrate a stream content in parallel according to the first memory block 1311 and the second memory block 1312, and then upload the stream content to the vehicle host chip via a communication channel.

It is worth noting that the different electronic devices described in the above embodiments may be arbitrarily combined according to device design requirements or usage requirements, and the number of modules, units, and chips in the embodiments may also increase based on the same technical concept and is not limited to as shown in the drawings of the disclosure.

In summary, in the electronic device according to some embodiments of the disclosure, the integrated chip may be configured to process or drive different touch modules in different touch areas, which can effectively save the chip space. According to some embodiments, the first processing unit processes or drives the first touch module and the display electrodes disposed in the first touch area, and the second processing unit processes or drives the second touch module disposed in the second touch area, which can effectively save the number of pads required for the first processing unit to save the cost of the first processing unit. The electronic device of the disclosure can integrate multiple touch functions and display driving functions.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An electronic device, having a first touch area and a second touch area, comprising:
   a first touch module, disposed in the first touch area and comprising a plurality of first touch electrodes;

a second touch module, disposed in the second touch area and comprising a plurality of second touch electrodes;

a plurality of display electrodes, disposed in the first touch area and the display electrodes are separated from the second touch area; and an integrated chip, electrically connected to the first touch module and the second touch module, and configured to process a first touch signal transmitted by at least one of the first touch electrodes and process a second touch signal transmitted by at least one of the second touch electrodes.

2. The electronic device according to claim 1, wherein the integrated chip comprises a first processing unit, and the first processing unit is configured to drive the first touch module and the display electrodes.

3. The electronic device according to claim 2, wherein the first processing unit is electrically connected between the first touch module and the integrated chip, wherein the electronic device further comprises:

a second processing unit, electrically connected between the second touch module and the integrated chip, and configured to drive the second touch module.

4. The electronic device according to claim 1, wherein the first touch module further comprises the display electrodes.

5. The electronic device according to claim 1, wherein the integrated chip comprises a timing controller and a processing circuit, and the timing controller is configured to provide a timing signal to the processing circuit, so that the processing circuit drives the first touch module and the second touch module according to the timing signal.

6. The electronic device according to claim 1, wherein the integrated chip comprises a first processing unit, and the first processing unit is configured to drive the first touch module and the display electrodes.

7. The electronic device according to claim 1, further comprising:

a display module, disposed in the first touch area, wherein the display module comprises the display electrodes, and the display module and the first touch module are separated.

8. The electronic device according to claim 1, further comprising:

a processing chip, electrically connected to the first touch module, configured to process another first touch signal transmitted by at least another one of the first touch electrodes, and electrically insulated from the second touch module.

9. The electronic device according to claim 1, further comprising:

a vehicle host chip, wherein the integrated chip is electrically connected between the vehicle host chip and the second touch module.

10. The electronic device according to claim 1, wherein the second touch module is a virtual sensing module.

11. An electronic device, having a first touch area and a second touch area, the electronic device comprising:

a first touch module, disposed in the first touch area and comprising a plurality of first touch electrodes;

a second touch module, disposed in the second touch area and comprising a plurality of second touch electrodes;

a plurality of display electrodes, disposed in the first touch area and are separated from the second touch area;

a first processing unit;

a first touch signal line, electrically connected between the first processing unit and at least one of the first touch electrodes;

a first display signal line, electrically connected between the first processing unit and at least one of the display electrodes;

a second processing unit; and a second touch signal line, electrically connected between the second processing unit and the second touch electrodes.

12. The electronic device according to claim 11, wherein the first touch electrodes and the second touch electrodes are disposed on a same substrate.

13. The electronic device according to claim 11, wherein the first touch electrodes and the second touch electrodes are disposed on different substrates.

14. The electronic device according to claim 11, wherein the first touch electrodes and the display electrodes are a same layer.

15. The electronic device according to claim 11, wherein the second touch module comprises:

a substrate, wherein the second touch electrodes are disposed on one side of the substrate; and a circuit board, comprising a light emitting unit emitting light toward the substrate.

16. The electronic device according to claim 11, further comprising a substrate, wherein the first touch electrodes and the display electrodes are disposed on different sides of the substrate.

17. The electronic device according to claim 11, having a first circuit configuration area, wherein the first circuit configuration area is disposed between the first touch area and the second touch area, and the first processing unit is disposed in the first circuit configuration area.

18. The electronic device according to claim 11, having a second circuit configuration area, wherein the second touch area is disposed between the first touch area and the second circuit configuration area, and the second processing unit is disposed in the second circuit configuration area.

19. The electronic device according to claim 11, further comprising:

a full digital integrated chip, electrically connected to the first processing unit, wherein the second processing unit is disposed in the full digital integrated chip or is electrically connected to the full digital integrated chip.

* * * * *